United States Patent
Huang

(10) Patent No.: US 11,973,684 B2
(45) Date of Patent: Apr. 30, 2024

(54) LINK AGGREGATION IMPLEMENTATION METHOD AND RELATED PRODUCT

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 303 days.

(21) Appl. No.: 17/369,634

(22) Filed: Jul. 7, 2021

(65) Prior Publication Data

US 2021/0336874 A1    Oct. 28, 2021

Related U.S. Application Data

(63) Continuation of application No. PCT/CN2020/070493, filed on Jan. 6, 2020.

(30) Foreign Application Priority Data

Jan. 11, 2019    (CN) .......................... 201910027554.3

(51) Int. Cl.
*H04L 45/24* (2022.01)
*H04W 28/08* (2023.01)
(Continued)

(52) U.S. Cl.
CPC ........... *H04L 45/245* (2013.01); *H04W 28/08* (2013.01); *H04W 72/542* (2023.01); *H04W 72/56* (2023.01)

(58) Field of Classification Search
CPC .. H04L 45/245; H04W 72/56; H04W 72/542; H04W 28/08
See application file for complete search history.

(56) References Cited

U.S. PATENT DOCUMENTS

| 2014/0029527 | A1 | 1/2014 | Okuda |
| 2015/0215738 | A1* | 7/2015 | Frusina ................ H04N 21/238 455/552.1 |

(Continued)

FOREIGN PATENT DOCUMENTS

| CA | 2917271 C | * 3/2019 | ........ H04W 36/0016 |
| CA | 2926653 C | * 11/2022 | ............. H04L 5/001 |

(Continued)

OTHER PUBLICATIONS

International Search Report with English Translation for PCT Application PCT/CN2020/070493 dated Apr. 3, 2020. (22 pages).

(Continued)

*Primary Examiner* — Saad A. Waqas

(74) *Attorney, Agent, or Firm* — Young Basile Hanlon & MacFarlane, P.C.

(57) ABSTRACT

The disclosure provides a method for implementing link aggregation. Multiple wireless networks are obtained by performing network search. Each wireless network corresponds to a respective access point device and a respective historical record of network resource allocation corresponding to a link aggregation. A respective target historical record of network resource allocation corresponding to each of at least one foreground application is determined from multiple historical records of network resource allocation. Multiple target historical records are obtained. Each wireless network corresponds to a respective target historical record. A priority order of the wireless networks is determined based on the multiple target historical records. A link aggregation is performed by selecting at least two wireless networks from the multiple wireless networks based on the priority order.

17 Claims, 5 Drawing Sheets

(51) Int. Cl.
    *H04W 72/542* (2023.01)
    *H04W 72/56* (2023.01)

(56) References Cited

U.S. PATENT DOCUMENTS

| | | | |
|---|---|---|---|
| 2017/0353919 | A1 | 12/2017 | Derham et al. |
| 2018/0054847 | A1 | 2/2018 | Cariou et al. |
| 2022/0110155 | A1* | 4/2022 | Chou ............... H04W 74/085 |

FOREIGN PATENT DOCUMENTS

| | | | | |
|---|---|---|---|---|
| CN | 102970157 | A | | 3/2013 |
| CN | 103825839 | A | | 5/2014 |
| CN | 105120509 | A | | 12/2015 |
| CN | 105722248 | A | | 6/2016 |
| CN | 106411731 | A | | 2/2017 |
| CN | 106453111 | A | | 2/2017 |
| CN | 108777666 | A | | 11/2018 |
| CN | 108881012 | A | | 11/2018 |
| CN | 109067571 | A | | 12/2018 |
| CN | 109640379 | A | | 4/2019 |
| WO | WO-2014165109 | A1 * | 10/2014 | ............ H04W 16/14 |
| WO | 2016184348 | A1 | | 11/2016 |

OTHER PUBLICATIONS

Chinese Office Action with English Translation for CN Application 201910027554.3 dated Mar. 2, 2020. (10 pages).
Chinese Notice of Allowance with English Translation for CN Application 201910027554.3 dated Jun. 9, 2020. (10 pages).
Dilmore et al., "Analysing Interface Bonding In 5G WLANs", IEEE 23rd International Workshop on Computer Aided Modeling and Design of Communication Links and Networks, 2018, 5 pages.
Trestian et al., "Seamless Multimedia Delivery Within a Heterogeneous Wireless Networks Environment: Are We There Yet?", IEEE Communications Surveys & Tutorials, vol. 20, No. 2, 2018, 33 pages.
Extended European Search Report for EP Application 20737995.9 dated Feb. 3, 2022. (11 pages).

* cited by examiner ial Application No. PCT/CN2020/070493, filed on Jan. 6,
LINK AGGREGATION IMPLEMENTATION METHOD AND RELATED PRODUCT

CROSS-REFERENCE TO RELATED APPLICATION(S)

This application is a continuation application of International Application No. PCT/CN2020/070493, filed on Jan. 6, 2020, which claims priority of Chinese Patent Application No. CN 201910027554.3, filed on Jan. 11, 2019, the entire contents of both of which are hereby incorporated by reference.

TECHNICAL FIELD

The disclosure relates to a field of communication technologies, specifically to a method for implementing link aggregation and a related product.

BACKGROUND

With development of mobile communication technologies, a user has high demand for data communication, and an electronic device (such as a mobile phone, a tablet computer, etc.) on the market is increasingly prone to use a link aggregation technology. At present, link aggregation refers to performing link aggregation by randomly selecting two wireless networks.

SUMMARY

A method for implementing link aggregation is provided, which is applied to an electronic device. The method includes: obtaining multiple wireless networks by performing network search, each wireless network corresponding to a respective access point device and a respective historical record of network resource allocation corresponding to link aggregation; determining a respective target historical record of network resource allocation corresponding to each of at least one foreground application from multiple historical records of network resource allocation corresponding to the multiple wireless networks, and obtaining multiple historical records, each wireless network corresponding to a respective target historical record; determining a priority order of the multiple wireless networks based on the multiple target historical records; and performing a link aggregation by selecting at least two wireless networks from the multiple wireless networks based on the priority order.

An electronic device is provided. The electronic device includes a processor, a memory, a communication interface, and one or more programs. The one or more programs are stored in the memory and are configured to be executed by the processor. The one or more programs include instructions for executing the above-mentioned method.

A non-transitory computer-readable storage medium is provided. The non-transitory computer-readable storage medium stores computer programs for electrical data exchange. The computer programs cause a computer to execute the above-mentioned method.

BRIEF DESCRIPTION OF DRAWINGS

In order to explain the technical solutions in embodiments of the disclosure or the related art clearly, the drawings described in embodiments or the related art will be briefly introduced below. Obviously, the drawings described as below are only some embodiments of the disclosure. Those skilled in the art may obtain other drawings from these drawings without creative work.

DETAILED DESCRIPTION

In order to make those skilled in the art well understand the technical solutions of the disclosure, the technical solutions in embodiments of the disclosure will be described clearly and completely in combination with the accompanying drawings in embodiments of the disclosure. Obviously, embodiments described are only a part of embodiments of the disclosure, rather than all embodiments. On the basis of embodiments of the disclosure, all other embodiments obtained by those skilled in the art without creative work are within the protection scope of the disclosure.

Terms "first", "second" or similar terms used in the description and the appended claims are configured only to distinguish different objects, rather than describe a specific order. In addition, terms "comprise" and "have" and their variations are intended to cover non-exclusive inclusions. For example, a process, method, system, product, or apparatus containing a series of blocks or units is not limited to the listed blocks or units, but may optionally further include blocks or units that are not listed, or may optionally further include blocks or units inherent to such process, method or apparatus.

Reference herein to "embodiment" means that features, structures, or characteristics described in this embodiment may be included in at least one other embodiment of the disclosure. Appearances of this term in various places of the description are not necessarily all referring to the same embodiment, nor separate or alternative to other embodiments. Those skilled in the art will understand explicitly and implicitly that the embodiments described herein may be combined with other embodiments.

The electronic device mentioned in embodiments of the disclosure may be an electronic device having an ability of implementing link aggregation. The electronic device may include all kinds of handheld devices with wireless communication function, vehicle-mounted devices, wearable devices, computing devices or other processing devices connected to wireless modems, as well as various kinds of user equipment (UE), mobile stations (MS), terminal devices, etc.

Embodiments of the disclosure will be described in detail below.

Figure 1:
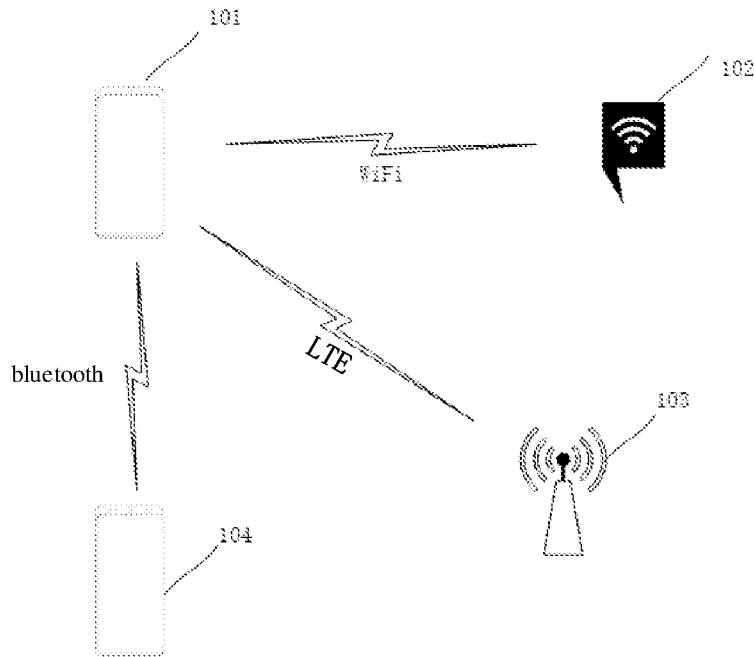
FIG. 1 is an example diagram illustrating a system architecture of a wireless communication system where an electronic device is located according to embodiments of the disclosure.

As illustrated in FIG. 1, in the present disclosure, the electronic device 101 may connect a mobile data network 103. The mobile data network is a communication network configured to transmit data services. Wi-Fi 102 is a technology for allowing the electronic device to connect a wireless local area network, usually adopting such as 2.4G UHF or 5G SHF ISM (industrial, scientific and medical index) radio frequency band. Bluetooth 104 is a wireless technology standard and may achieve short-distance data exchange between fixed devices, mobile devices and personal are networks of buildings, etc.

In embodiments of the disclosure, Wireless-Fidelity, referred to as Wi-Fi, is a wireless connection manner. An electronic device may include a Wi-Fi module (also referred to as a Wi-Fi communication module) to enable the electronic device to have a Wi-Fi function. The electronic device may search for Wi-Fi hotspots and connect a wireless network through a Wi-Fi hotspot. A Wi-Fi data link is a data connection path established between the electronic device and the wireless network through a Wi-Fi communication module interface. When the electronic device is connected to the network via the Wi-Fi hotspot, it is possible to save traffic fees without accessing the networks of operators such as ChinaMobile, Unicom, and ChinaNet.

In embodiments of the disclosure, link aggregation refers to that a device can use two or more network interfaces to connect the network. For example, a mobile phone can access the internet using both the Wi-Fi and data network (cellular network, also refers to as mobile data network), or two or more Wi-Fi networks simultaneously based on the link aggregation. Smart Link Aggregation (SLA) refers to smartly allocating the user requirement on accessing internet to different internet access interfaces (such as a cellular communication module interface, a Wi-Fi communication module interface). Link aggregation requires at least two or more available networks, and thus a precondition of the SLA is that the Wi-Fi and the data network coexist.

Figure 2:
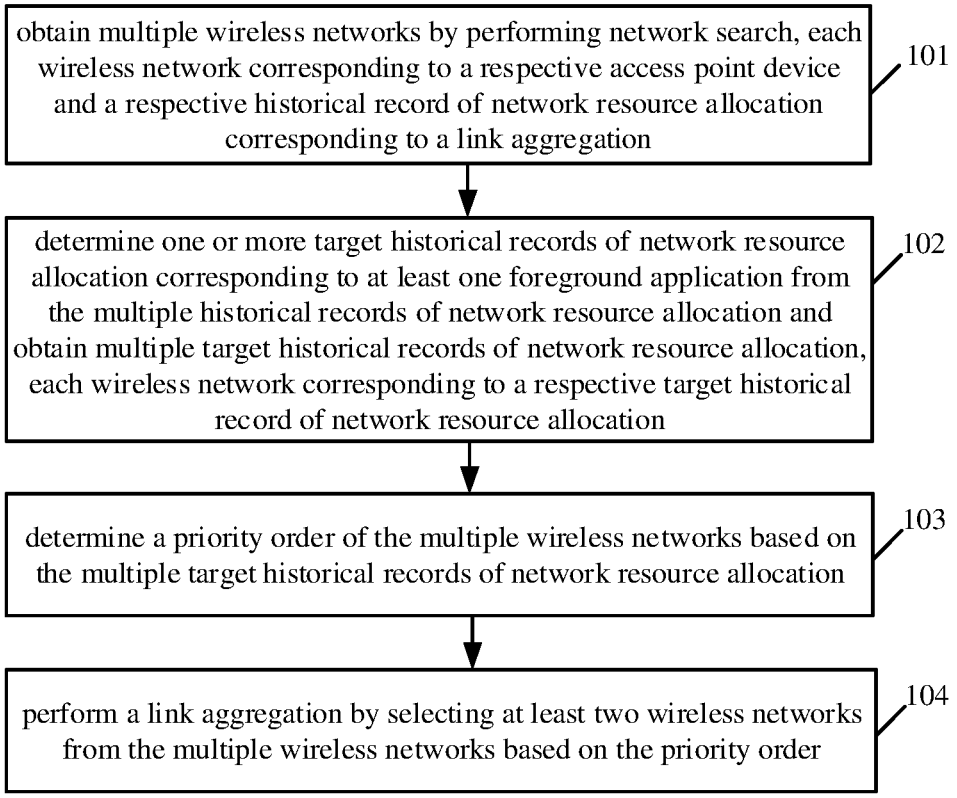
FIG. 2 is a flowchart illustrating a method for implementing link aggregation according to embodiments of the disclosure.

As illustrated in FIG. 2, FIG. 2 is a flowchart illustrating a method for implementing link aggregation according to embodiments of the disclosure. The method is applied to an electronic device and includes the following.

At 101, multiple wireless networks are obtained by performing network search. Each wireless network corresponding to a respective access point device and a respective historical record of network resource allocation corresponding to a link aggregation.

Embodiments of the application may be applied to an indoor environment, such as a smart home environment. The smart home environment includes multiple smart home devices, and each smart home device may be deemed as an access point device. The access point device may be at least one of a smart television, a smart washing machine, a smart air conditioner, a smart water heater, a tablet computer, a smart phone, a smart door, a smart massage chair, a smart dryer, a smart electric rice cooker, a smart soybean milk machine, a smart water dispenser, etc., which is not limited in the disclosure.

In detail, in embodiments of the disclosure, the electronic device may initiate the Wi-Fi module to perform wireless network search to obtain the multiple wireless networks. Each wireless network corresponds to an access point device and a historical record of network resource allocation corresponding to the link aggregation. No matter which access point device is used to implement the link aggregation, a corresponding historical record of network resource allocation is generated. Each historical record of network resource allocation corresponds to a respective allocation ratio coefficient of network resource ranging from 0 to 1. The historical record of network resource allocation may include the following information: an IP (Internet protocol) address of the access point device, time when achieving the link aggregation, a foreground application when implementing the link aggregation, a device identifier of a device for implementing the link aggregation (e.g., an IP address, a MAC (Media Access Control) address, a SIM (Subscriber Identity Module) card number, an IMEI (International Mobile Equipment Identity), an ICCID (Integrated Circuit Card Identity)). In detail, every time when the link aggregation is performed between the electronic device and an additional access point device, a corresponding historical record of network resource allocation is generated.

At 102, a respective target historical record of network resource allocation corresponding to each of at least one foreground application is determined from the historical records of network resource allocation corresponding to the multiple wireless networks, and multiple target historical records of network resource allocation are obtained. Each wireless network corresponds to a respective target historical record of network resource allocation.

The above-mentioned foreground application may be at least one of desktop application, game application, instant messaging application, screen locking application, payment application, browser application, video-related application, etc., which is not limited here. Further, in embodiments of the disclosure, there may be one or more foreground applications. For example, when being in a split-screen mode, there may be multiple foreground applications. For an electronic device with a foldable screen, there may be multiple foreground applications. For an electronic device with a two-sided screen, there may be 2 foreground applications.

In detail, when each wireless network performs the link aggregation, a respective historical record of network resource allocation can be generated. As described above, the electronic device may determine a respective target historical record of network resource allocation for each foreground application from the historical records of network resource allocation corresponding to the wireless networks, and obtain the multiple target historical records of network resource allocation. Each wireless network corresponds to a respective target historical record of network resource allocation. In detail, the electronic device may determine the target historical records of network resource allocation for one or more foreground applications from the historical records of network resource allocation corresponding to the multiple wireless networks, and the historical records of network resource allocation may include at least one of application identifier of the foreground application, operation mode corresponding to the foreground application (such as a split screen mode, a foldable screen mode, a single screen mode, a double-sided screen mode, or the like), an allocation rate coefficient of network resource, which is not limited here.

In some embodiments, at 102, determining the respective target historical record of network resource allocation corresponding to each of the at least one foreground application from the historical records of network resource allocation corresponding to the multiple wireless networks and obtaining the multiple target historical records of network resource allocation may include 21 and 22.

At 21, while the electronic device is in a preset operation mode, one foreground application is selected from the at least one foreground application as a target foreground application.

At 22, a target historical record of network resource allocation corresponding to the current foreground application and the preset operation mode is determined from the historical records of network resource allocation corresponding to the multiple wireless networks and multiple target historical records of network resource allocation are obtained.

The preset operation mode may be at least one of single screen mode, split screen mode, foldable screen mode, and double-sided screen mode, which is not limited here. In detail, a corresponding historical record of network resource allocation is determined based on the foreground application running on the electronic device and the operation mode corresponding to the foreground application. For example, while the electronic device is in the preset operation mode, the electronic device can select a foreground application from the at least one foreground application as a target foreground application and determine the target historical record of network resource allocation corresponding to the target foreground application and the preset operation mode from the historical records of network resource allocation of the multiple wireless networks, and thus obtain the multiple target historical records of network resource allocation. As a result, a historical record of network resource allocation matching the foreground application and the preset operation mode may be obtained, which helps to implement the link aggregation reasonably and improve the intelligence of the link aggregation.

At 103, a priority order of the multiple wireless networks is determined based on the multiple target historical records of network resource allocation.

Based on big data, generally, the larger the allocation ratio coefficient of network resource in a historical record of network resource allocation of a certain wireless network, the higher the priority is. However, based on a large number of data, performance of each wireless network may be grasped macroscopically, to avoid inaccurate analysis through single data. Therefore, in embodiments of the disclosure, the electronic device may determine the priority order of the multiple wireless networks based on the multiple target historical records of network resource allocation.

Optionally, determining the priority order of the multiple wireless networks based on the multiple target historical records of network resource allocation at 103 may include 31 to 33.

At 31, one or more target allocation ratio coefficients of network resource corresponding to each target historical record of network resource allocation of the multiple historical records of network recourse allocation are obtained, and multiple allocation ratio coefficient sets of network resource are obtained. Each allocation ratio coefficient set of network resource includes at least one target allocation ratio coefficient of network resource.

At 32, a respective evaluation value corresponding to each wireless network in the multiple wireless networks is determined based on the multiple allocation ratio coefficient ratios of network resource, and multiple evaluation values are obtained.

At 33, the priority order of the multiple wireless networks is determined based on the multiple evaluation values.

In detail, the electronic device may obtain the target allocation ratio coefficient of network resource corresponding to each target historical record of network resource allocation in the multiple target historical records of network resource allocation and obtain the multiple allocation ratio coefficient sets of network resource. Each wireless network corresponding to a respective allocation ratio coefficient set of network resource. Each allocation ratio coefficient set of network resource includes at least one target allocation ratio coefficient of network resource. Further, the electronic device can determine the evaluation value corresponding to each wireless network in the multiple wireless networks based on the multiple allocation ratio coefficient sets of network resource, obtain the multiple evaluation values, and determine the priority order of the multiple wireless networks based on the multiple evaluation values. For example, an average value corresponding to each allocation ratio coefficient set of network resource may be calculated, and the priority order of the multiple wireless networks can be determined based on a descending order of the average values.

Further, optionally, at 32, determining the evaluation value corresponding to each wireless network in the multiple wireless networks based on the multiple allocation ratio coefficient ratios of network resource and obtaining the multiple evaluation values may include 321-324.

At 321, a target number of the target allocation ratio coefficients of network resource included in an allocation ratio coefficient set i of network resource is determined and a target average value of all allocation ratio coefficients of network resource is determined. The allocation ratio coefficient set i of network resource is any one of the multiple allocation ratio coefficient sets of network resource.

At 322, a target first weight corresponding to the target number is determined based on a preset mapping relationship between numbers and first weights.

At 323, a target second weight is determined based on the target first weight. The sum of the target first weight and the target second weight is 1.

At 324, the evaluation value corresponding to the allocation ratio coefficient set i of network resource is obtained by calculating based on the target first weight, the target average value and the target second weight.

In detail, the mapping relationship between numbers and first weights can be stored in the electronic device, where the sum of the first weight and the second weight is 1. Further, the performance of each wireless network is evaluated on the two dimensions of the number and the average value. Taking the allocation ratio coefficient set i of network resource as an example, where the allocation ratio coefficient set i of network resource is any one of the multiple allocation ratio coefficient sets of network resource, the electronic device may determine the target number of the target allocation ratio coefficients of network resource in the allocation ratio coefficient set i of network resource and a target average value of all allocation ratio coefficients of network resource, determine the target first weight corresponding to the target number based on the preset mapping relationship between numbers and first weights, and obtain the target second weight. In this case, the evaluation value corresponding to the allocation ratio coefficient set i of network resource=the target first weight+the target average value*the target second weight. By evaluating the wireless network based on the number and average value of each allocation ratio coefficient of network resource of the wireless network, a high-performance wireless network may be selected appropriately to a certain extent for the link aggregation.

At 104, the link aggregation is performed by selecting at least two wireless networks from the multiple wireless networks based on the priority order.

On a certain extent, the higher the priority is, the better the performance of the network is. The electronic device can perform the link aggregation by selecting at least two wireless networks from the multiple wireless networks based on the priority order. Therefore, stability of the network of the electronic device may be ensured as much as possible.

For example, in a smart home environment, an electronic device can acquire a foreground application and determine a condition of network resource allocation of multiple access point devices for the foreground application, determine selection priorities for the link aggregation based on the condition of network resource allocation, and perform the link aggregation by selecting two access point devices with high priorities based on the selection priorities. Therefore, the performance of the network of the electronic device can be improved.

Performing the link aggregation by selecting at least two wireless networks from the multiple wireless networks based on the priority order in 104 may include 41-43.

At 41, an indoor position corresponding to the electronic device is obtained.

At 42, multiple distances are obtained by determining a respective distance between the indoor location and an access point device corresponding to each one of the multiple wireless networks.

At 43, at least two distances less than a preset distance are selected from the multiple distances, and the link aggregation is performed by selecting at least two wireless networks from multiple wireless networks corresponding to the at least two distances based on the priority order.

The preset distance may be set by the user or default by system. The electronic device can determine the indoor location corresponding to the electronic device through an indoor positioning technology, and the closer the access point device to the electronic device, the better the stability is. In detail, since the position of the each access point device is fixed, the distance between the indoor position and the access point device corresponding to each wireless network in the multiple wireless networks may be determined, the multiple distances can be determined, at least two distance values smaller than the preset distance value are selected from the multiple distance values, and the link aggregation is performed by selecting at least two wireless networks from multiple wireless networks corresponding to the at least two distances based on the priority order. Therefore, the link aggregation network stability may be guaranteed.

Optionally, before the above 101, A1 and A2 can be considered.

At A1, a current network rate is obtained.

At A2, the network search is executed when the current network rate is lower than a preset network rate.

The preset network rate may be set by the user or default by system. In detail, the electronic device can obtain the current network rate, and 101 can be executed when the current network rate is lower than a preset network rate. Since the low network rate influences the user experience, link aggregation can be executed when the network rate is low to enhance the online experience of the user.

Optionally, when the electronic device initiates the SLA function, the electronic device can perform 101 as described above.

Optionally, before 101, B1 and B2 may be included.

At B1, a quantity of electricity of the electronic device is detected.

At B2, the network search is executed when the quantity of electricity is greater than a preset quantity threshold.

The preset quantity threshold may be set by the user or default by system. In detail, the SLA may increase power consumption of the electronic device to a certain degree, in order to ensure smooth execution of the SLA function, the electronic device may detect the current quantity of electricity of the electronic device. When the current quantity of electricity of the electronic device is greater than the preset quantity threshold, the network search is executed.

Optionally, during the process of executing 104 of performing the link aggregation by selecting at least two wireless networks from the multiple wireless networks based on the priority order, in a case where the at least two wireless networks include two Wi-Fi data networks, performing the link aggregation based on the two wireless networks may include C1 to C3.

At C1, link quality of a first Wi-Fi data link and link quality of a second Wi-Fi data link are detected.

At C2, an allocation ratio of data packet of the first Wi-Fi data link to the second Wi-Fi data link is determined based on the link quality of the first Wi-Fi data link and the link quality of the second Wi-Fi data link.

At C3, transmitting data packets by allocating the data packets to be transmitted to the first Wi-Fi data link and the second Wi-Fi data link based on the allocation ratio of data packet.

The link quality of the Wi-Fi data link may be determined by uplink and downlink data transmission rate, round-trip delay, and bit error rate of the Wi-Fi data link. The higher the uplink and downlink data transmission rate, the smaller the round-trip delay, and the lower the bit error rate, the higher the link quality of the Wi-Fi data link is. The lower the uplink and downlink data transmission rate, the greater the round-trip delay, the higher the bit error rate, the lower the link quality of the Wi-Fi data link is.

The Wi-Fi data link may include a Wi-Fi data uplink and a Wi-Fi data downlink. The quality of the Wi-Fi data uplink may be determined by the uplink data transmission rate, round-trip delay and bit error rate of the Wi-Fi data link. The quality of the Wi-Fi data downlink may be determined by the downlink data transmission rate, round-trip delay and bit error rate of the Wi-Fi data link.

The bit error rate is an index measuring accuracy of data transmission within a specified time. That is, the bit error rate=error bits in transmission/total transmitted bit number*100%.

The electronic device can initiate the SLA function before 101. The electronic device can further enable dual Wi-Fi connection simultaneously.

When the electronic device initiates the SLA function, the electronic device can send a network request to a network side to enable the data network, so that the electronic device may initiate a first Wi-Fi network and a second Wi-Fi network simultaneously and use both the two Wi-Fi networks.

Optionally, detecting the link quality of the first Wi-Fi data link by the electronic device may include the following.

The data transmission rate, the round-trip delay, and the bit error rate of the first Wi-Fi data link are measured by the electronic device. The link quality of the first Wi-Fi data link is determined based on the round-trip delay, the data transmission rate, and the bit error rate of the first Wi-Fi data link.

Detecting the link quality of the second Wi-Fi data link by the electronic device may include the following.

The data transmission rate, the round-trip delay, and the bit error rate of the second Wi-Fi data link are measured by the electronic device. The link quality of the second Wi-Fi data link is determined based on the round-trip delay, the data transmission rate, and the bit error rate of the second Wi-Fi data link.

In embodiments of the disclosure, if the link quality of the first Wi-Fi data link is better than that of the second Wi-Fi data link, it is determined that the allocation ratio of data packet of the first Wi-Fi data link to the second Wi-Fi data link is greater than 1. If the link quality of the second Wi-Fi data link is better than that of the first Wi-Fi data link, it is determined that the allocation ratio of data packet of the second Wi-Fi data link to the first Wi-Fi data link is greater than 1.

A quality score of the Wi-Fi data link can be obtained by scoring the link quality of the Wi-Fi data link may be scored based on the uplink and downlink data transmission rate, round-trip delay, and bit error rate of the Wi-Fi data link. The electronic device may use a ratio of the quality score of the first Wi-Fi data link to the quality score of the second Wi-Fi data link as the allocation ratio of data packet of the first Wi-Fi data link to the second Wi-Fi data link.

The electronic device may further determine a quality level of the first Wi-Fi data link based on the quality score of the first Wi-Fi data link, determine a quality level of the second Wi-Fi data link based on the quality score of the second Wi-Fi data link, and determine the allocation ratio of data packet of the first Wi-Fi data link to the second Wi-Fi data link based on the quality level of the first Wi-Fi data link and the quality level of the second Wi-Fi data link. Certainly, the allocation ratio of data packet of the first Wi-Fi data link to the second Wi-Fi data link may be determined based on a ratio of the quality level of the first Wi-Fi data link to the quality level of the second Wi-Fi data link. As an example, the link quality of the first Wi-Fi data link is level 1, and the quality level of the second Wi-Fi data link is level 1. In this case, the allocation ratio of data packet between the first Wi-Fi data link and the second Wi-Fi data link is 1:1. As another example, the link quality of the first Wi-Fi data link is level 1, and the quality level of the second Wi-Fi data link is level 2. In this case, the allocation ratio of data packet of the first Wi-Fi data link to the second Wi-Fi data link is 1:2. As still another example, the link quality of the first Wi-Fi data link is level 1, and the link quality of the second Wi-Fi data link is level 3. In this case, the allocation ratio of data packet of the first Wi-Fi data link to the second Wi-Fi data link is 1:3. As yet another example, the link quality of the first Wi-Fi data link is level 1, and the quality level of the second Wi-Fi data link is level 4. In this case, the allocation ratio of data packet of the first Wi-Fi data link to the second Wi-Fi data link is 1:4. As yet another example, the link quality of the first Wi-Fi data link is level 1, and the quality level of the second Wi-Fi data link is level 5. In this case, the allocation ratio of data packet of the first Wi-Fi data link to the second Wi-Fi data link is 1:5.

In embodiments of the disclosure, an electronic device can send an uplink data packet and receive a downlink data packet. A data packet to be transmitted may be an uplink data packet or a downlink data packet. For the uplink data packet, the electronic device may transmit the uplink data packet by allocating the uplink data packet to the first Wi-Fi data uplink and the second Wi-Fi data uplink. For the downlink data packet, the electronic device may transmit the downlink data packet by allocating the downlink data packet to the first Wi-Fi data downlink and the second Wi-Fi data downlink.

The data packet to be transmitted may be initiated by different services of the electronic device. For example, the data packet to be transmitted may be initiated by any one of video service, game service, voice service, and instant messaging service.

Optionally, at C1, detecting the link quality of the first Wi-Fi data link and the link quality of the second Wi-Fi data link may include the following.

A maximum data transmission rate of the first Wi-Fi data link and a maximum data transmission rate of the second Wi-Fi data link are measured by the electronic device. The link quality of the first Wi-Fi data link and the link quality of the second Wi-Fi data link are determined based on the maximum data transmission rate of the first Wi-Fi data link and the maximum data transmission rate of the second Wi-Fi data link.

In embodiments of the disclosure, the link quality of the first Wi-Fi data link and the link quality of the second Wi-Fi data link may be calculated based on the following formula:

$$\text{weigh\_wifi1} = \text{max\_speed\_wifi1}/(\text{max\_speed\_wifi1} + \text{max\_speed\_wifi2}); \text{ and}$$

$$\text{weigh\_wifi2} = 1 - \text{weigh\_wifi1};$$

where, weigh_wifi1 represents the link quality of the first Wi-Fi data link, weigh_wifi2 represents the link quality of the second Wi-Fi data link, max_speed_wifi1 represents the maximum data transmission rate of the first Wi-Fi data link, and max_speed_wifi2 represents the maximum data transmission rate of the second WiFi data link. The sum of the link quality of the first Wi-Fi data link and link quality of the second Wi-Fi data link equals to 1.

The electronic device can determine the allocation ratio of data packet of the first Wi-Fi data link to the second Wi-Fi data link based on the ratio of the link quality of the first Wi-Fi data link to the link quality of the second Wi-Fi data link.

For example, the link quality of the first Wi-Fi data link is 0.2, and the link quality of the second Wi-Fi data link is 0.8. In this case, the allocation ratio of data packet of the first Wi-Fi data link to the second Wi-Fi data link is 2:8.

Optionally, the maximum data transmission rate of the second Wi-Fi data link and the maximum data transmission rate of the first Wi-Fi data link can be corrected by data increment calculation rate on the wifi1 and wifi2 receiving (rx) interfaces.

For example, the data increment calculation rate on the wifi1 and the wifi2 receiving (rx) interfaces is counted every 1 s (second), and the maximum data transmission rate of the first WiFi data link and the maximum data transmission rate of the second Wi-Fi data link are corrected by the data increment calculation rate.

$$\text{tmp\_speed} = (rx\_\text{bytes} - \text{last\_}rx\_\text{bytes})/1;$$

$$\text{corrected\_max\_speed\_wifi1} = \max(\text{max\_speed\_wifi1}, \text{tmp\_speed});$$

$$\text{corrected\_max\_speed\_wifi2} = \max(\text{max\_speed\_wifi2}, \text{tmp\_speed});$$

where, rx_bytes represents the data reception amount on the wifi1 and wifi2 receiving interfaces within one second; last rx bytes represents the data reception amount on the wifi1 and wifi2 receiving interfaces within a previous second, tmp_speed represents the data increment calculation rate, max_speed_wifi1 represents the maximum data transmission rate of the first Wi-Fi data link, and max_speed_wifi2 represents the maximum data transmission rate of the second Wi-Fi data link. The corrected max_speed_wifi1 is the maximum one between max_speed_wifi1 and tmp_speed, and the corrected max_speed_wifi2 is the maximum one between max_speed_wifi2 and tmp_speed.

Optionally, the maximum data transmission rate of the second Wi-Fi data link and the maximum data transmission rate of the first Wi-Fi data link can be corrected by calculating the Round-Trip Time (rtt).

For example, the electronic device may calculate the time delay on two interfaces (Wi-Fi communication module interface 1 and Wi-Fi communication module interface 2) based on the rtt of the TCP (transmission control protocol) protocol, and one data link only calculates the rtt of a first request after three handshakes, for example, rrt of http get, http post. Three handshakes refer to three acknowledgement processes for establishing the TCP connection. The TCP counts the rtt through the tcp_rtt_estimator( ) function and calculates the retransmission timeout (RTO). Therefore, the time delay is calculated by the tcp_rtt_estimator( ) function.

The electronic device determines a current first RTT of the first Wi-Fi data link and a current first RTT of the second Wi-Fi data link respectively, which includes the following.

The electronic device determines a second RTT by running one TCP.

The electronic device obtains a third RTT that was determined last one on the first Wi-Fi communication module and a third RTT that was determined last one on the second Wi-Fi communication module.

The electronic device determines the current first RTT of the first Wi-Fi communication module and the current first RTT of the second Wi-Fi communication module based on the determined second RTT, the third RTT determined last time on the first Wi-Fi communication module and the third RTT determined last time on the second Wi-Fi communication module.

In detail, the current first RTT of the first Wi-Fi data link and the current first RTT of the second Wi-Fi data link are calculated by the following formulas:

$$rtt\_wifi\_1=(rtt\_wifi1\_3+rtt\_2)/2;$$

$$rtt\_wifi2\_1=(rtt\_wifi2\_3+rtt\_2)/2,$$

where, rtt_wifi_1 represents the current first RTT of the first Wi-Fi data link, rtt_2 represents the second RTT by running one TCP, rtt_wifi1_3 represents the third RRT determined last time on the first Wi-Fi data link; rtt_wifi2_1 represents the current first RRT of the second Wi-Fi data link, rtt_2 represents a second RTT running one TCP, and rtt_wifi2_3 represents the third RTT determined last time on the second Wi-Fi data link.

Embodiments of the disclosure consider the data transmission rate and the round-trip time, which may improve calculation accuracy of link quality with the two Wi-Fi data links.

It can be seen that, with the method for implementing link aggregation according to embodiments of the disclosure applied to an electronic device, the multiple wireless networks are obtained by performing the network search. Each wireless network corresponds to an access point device and a historical record of network resource allocation corresponding to the link aggregation. The respective target historical record of network resource allocation corresponding to each of the at least one foreground application is determined from the multiple historical records of network resource allocation corresponding to the multiple wireless networks, and the multiple target historical records of network resource allocation are obtained. Each wireless network corresponds to a target historical record of network resource allocation. The priority order is determined for the multiple wireless networks based on the multiple target historical records of network resource allocation. The link aggregation is performed by selecting the at least two wireless networks from the multiple wireless networks based on the priority order. Therefore, a priority order of accessing the wireless networks may be determined based on the historical records of network resource allocation corresponding to the wireless networks, and the link aggregation is implemented by selecting the wireless networks based on the priority order, to improve the intelligence of link aggregation.

Figure 3:
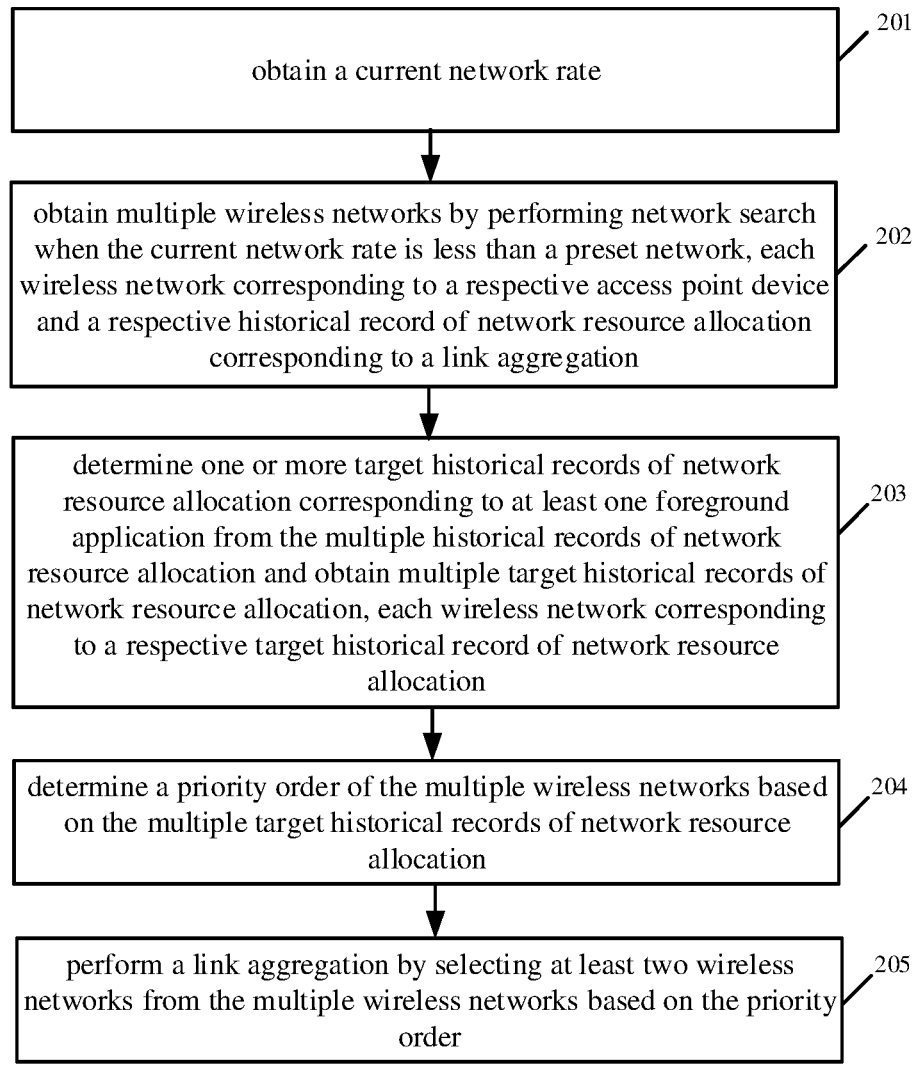
FIG. 3 is a flowchart illustrating another method for implementing link aggregation according to embodiments of the disclosure.

As illustrated in FIG. 3 which is in accordance with embodiments of the above FIG. 2, FIG. 3 is a flowchart illustrating a method for implementing link aggregation according to embodiments of the disclosure. As illustrated in figure, the method includes the following.

At 201, a current network rate is obtained.

At 202, multiple wireless networks are obtained by performing network search when the current network rate is lower than a preset network rate. Each wireless network corresponds to a respective access point device and a respective historical record of network resource allocation corresponding to link aggregation.

At 203, a respective target historical record of network resource allocation corresponding to each of at least one foreground application is determined from the historical records of network resource allocation corresponding to the multiple wireless networks, and multiple target historical records of network resource allocation are obtained. Each wireless network corresponding to a respective target historical record of network resource allocation.

At 204, a priority order of the multiple wireless networks is determined based on the multiple target historical records of network resource allocation.

At 205, the link aggregation is performed by selecting at least two wireless networks from the multiple wireless networks based on the priority order.

Details of 201 to 205 may refer to the corresponding descriptions in the method for implementing link aggregation as described in FIG. 2, which are not repeated here.

It can be seen that, with the method for implementing link aggregation according to embodiments of the disclosure applied to an electronic device, the multiple wireless networks are obtained by performing the network search when the current network rate is less than the preset network rate. Each wireless network corresponds to an access point device and a historical record of network resource allocation corresponding to the link aggregation. The respective target historical record of network resource allocation corresponding to each of the at least one foreground application is determined from the multiple historical records of network resource allocation corresponding to the multiple wireless networks, and the multiple target historical records of network resource allocation are obtained. Each wireless network corresponds to a target historical record of network resource allocation. The priority order is determined for the multiple wireless networks based on the multiple target historical records of network resource allocation. The link aggregation is performed by selecting the at least two wireless networks from the multiple wireless networks based on the priority order. Therefore, when the network rate of a single network is poor, the priority order of accessing the wireless networks may be determined based on the historical records of network resource allocation corresponding to the wireless networks, and the link aggregation is implemented by selecting the wireless networks based on the priority order, to improve the intelligence of link aggregation.

Figure 4:
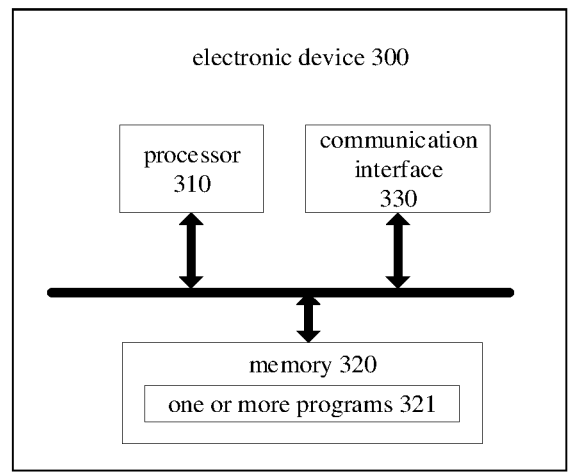
FIG. 4 is a schematic diagram illustrating a structure of an electronic device according to embodiments of the disclosure.

As illustrated in FIG. 4 that is in accordance with the embodiments as illustrated in FIG. 2 and FIG. 3, FIG. 4 is a block diagram illustrating an electronic device 300 according to embodiments of the disclosure. As illustrated in the figure, the electronic device 300 includes a processor 310, a memory 320, a communication interface 330 and one or more programs 321. The one or more programs 321 are stored in the memory 320 and configured to be executed by the processor 310. The one or more programs 321 include instructions configured to execute the following.

Multiple wireless networks are obtained by performing network search. Each wireless network corresponds to a respective access point device and a historical record of network resource allocation corresponding to a link aggregation.

A respective target historical record of network resource allocation corresponding to each of at least one foreground application is determined from the historical records of network resource allocation corresponding to the multiple wireless networks, and multiple target historical records of network resource allocation are obtained. Each wireless network corresponds to a respective target historical record of network resource allocation.

A priority order of the multiple wireless networks is determined based on the multiple target historical records of network resource allocation.

A link aggregation is implemented by selecting at least two wireless networks from the multiple wireless networks based on the priority level.

It can be seen that, with the electronic device according to embodiments of the disclosure, the multiple wireless networks are obtained by performing the network search. Each wireless network corresponds to an access point device and a historical record of network resource allocation corresponding to the link aggregation. The respective target historical record of network resource allocation corresponding to each of the at least one foreground application is determined from the multiple historical records of network resource allocation corresponding to the multiple wireless networks, and the multiple target historical records of network resource allocation are obtained. Each wireless network corresponds to a target historical record of network resource allocation. The priority order is determined for the multiple wireless networks based on the multiple target historical records of network resource allocation. The link aggregation is performed by selecting the at least two wireless networks from the multiple wireless networks based on the priority order. Therefore, a priority order of accessing the wireless networks may be determined based on the historical records of network resource allocation corresponding to the wireless networks, and the link aggregation is implemented by selecting the wireless networks based on the priority order, to improve the intelligence of link aggregation.

In a possible example, for determining the respective target historical record of network resource allocation corresponding to each of the at least one foreground application from the historical records of network resource allocation corresponding to the multiple wireless networks and determining the multiple target historical records of network resource allocation, the one or more programs 321 include instructions configured to execute the following.

One foreground application is selected from the at least one foreground application as a target foreground application while the electronic device is in a preset operation mode.

A target historical record of network resource allocation corresponding to the target foreground application and the preset operation mode from the historical records of network resource allocation of the multiple wireless networks, and the multiple target historical records of network resource allocation are obtained.

In a possible example, in determining the priority order of the multiple wireless networks based on the multiple target historical records of network resource allocation, the one or more programs 321 include instructions configured to execute the following.

A target allocation ratio coefficient of network resource corresponding to each one of the multiple target historical records of network resource allocation, and multiple allocation ratio coefficient sets of network resource are obtained. Each allocation ratio coefficient set of network resource includes at least one target allocation ratio coefficient of network resource.

A respective evaluation value corresponding to each wireless network of the multiple wireless networks is determined based on the multiple allocation ratio coefficient sets of network resource.

The priority level of the multiple wireless networks based on the evaluation values.

In a possible example, in determining the evaluation value corresponding to each wireless network of the multiple wireless networks based on the multiple allocation ratio coefficient sets of network resource, the one or more programs 321 include instructions configured to execute the following.

A target number of the target allocation ratio coefficients of network resource included in an allocation ratio coefficient i of network resource is determined and a target average value of all allocation ratio coefficients of network resource is determined. The allocation rate coefficient set i of network resource is any one of the multiple allocation ratio coefficient sets of network resource.

A target first weight corresponding to the target number is determined based on a preset mapping relationship between numbers and first weights.

A second target weight is determined based on the target first weight. The sum of the target first weight and the target second weight is 1.

The evaluation value corresponding to the allocation ratio coefficient set i of network resource is obtained through computing based on the target first weight, the target average value and the target second weight.

In a possible example, in performing the link aggregation by selecting the at least two wireless networks from the multiple wireless networks based on the priority order, the one or more programs 321 include instructions configured to execute the following.

An indoor position corresponding to the electronic device is obtained.

A respective distance between the indoor location and an access point device corresponding to each wireless network of the multiple wireless networks is determined, and multiple distances are obtained.

Selecting at least two distances less than a preset distance from the multiple distances, and performing the link aggregation by selecting the at least two wireless networks from multiple wireless networks corresponding to the at least two distances based on the priority level.

In a possible example, in a case where the at least two wireless networks include two Wi-Fi data networks, in performing the link aggregation by selecting the at least two wireless networks from the wireless networks corresponding to the at least two distances, the one or more programs 321 include instructions configured to execute the following.

Link quality of a first Wi-Fi data link and link quality of a second Wi-Fi data link are detected.

An allocation ratio of data packet of the first Wi-Fi data link to the second Wi-Fi data link is determined based on the link quality of the first Wi-Fi data link and the link quality of the second Wi-Fi data link.

Data packets are transmitted by allocating the data packets to be transmitted to the first Wi-Fi data link and the second Wi-Fi data link based on the allocation ratio of data packet.

In a possible example, in detecting the link quality of the first Wi-Fi data link, the one or more programs 321 include instructions configured to execute the following.

A data transmission rate, a round-trip delay and a bit error rate of the first Wi-Fi data link are measured. The link quality of the first Wi-Fi data link is determined based on the round-trip delay, the data transmission rate, and the bit error rate of the first Wi-Fi data link.

In a possible example, the one or more programs 321 further include instructions configured to execute the following.

A current network rate is obtained.

The network search is performed when the current network rate is lower than a preset network rate.

In a possible example, the one or more programs 321 further include instructions configured to execute the following.

A current quantity of electricity of the electronic device is detected.

The network search is performed when the current quantity of electricity is greater than a preset quantity threshold.

The technical solutions of embodiments of the disclosure are mainly introduced from the perspective of execution process at method side. It could be understood that, the electronic device includes hardware structures and/or software modules that execute various functions in order to implement the above functions. Those skilled in the related art should be easily aware that, in combination with the units and algorithm steps of the examples described in embodiments of the disclosure, the disclosure may be implemented in the form of a hardware or a combination of a hardware and a computer software. Whether a function is executed by a hardware or a computer software driven by a hardware depends on the specific application and design constraints of the technical solution. Those skilled in the art may adopt different methods for each specific application to implement the described functions, but such implementation should not be considered beyond the scope of the disclosure.

Embodiments of the disclosure may divide the functional units of the electronic device according to the above method examples, for example, various functional units may be divided corresponding to various functions, and two or more functions may be integrated in one processing unit. The above integrated unit may be implemented in the form of a hardware or in the form of a software functional unit. It should be noted that, the division of units in embodiments of the disclosure is illustrative, only a logical function division. There may be another division method in the actual implementation.

Figure 5:
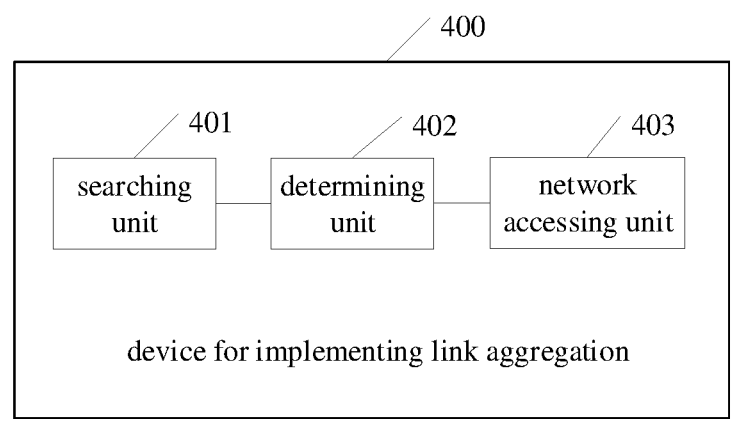
FIG. 5 is a block diagram illustrating composition of functional units of a device for implementing link aggregation according to embodiments of the disclosure.

FIG. 5 is a block diagram illustrating composition of functional units of a device 400 for implementing link aggregation according to embodiments of the disclosure. The device 400 for implementing link aggregation is integrated into an electronic device includes a searching unit 401, a determining unit 402 and a network accessing unit 403.

The searching unit 401 is configured to obtain multiple wireless networks by performing network search. Each wireless network corresponds to a respective access point device and a respective historical record of network resource allocation corresponding to a link aggregation.

The determining unit 402 is configured to determine a respective target historical record of network resource allocation corresponding to each of at least one foreground application from the historical records of network resource allocation corresponding to the multiple wireless networks, and obtain multiple target historical records of network resource allocation. Each wireless network corresponds to a respective target historical record of network resource allocation. Further, the determining unit 402 is configured to determine a priority order of the multiple wireless networks based on the multiple target historical records of network resource allocation.

The network accessing unit 403 is configured to perform a link aggregation by selecting at least two wireless networks from the multiple wireless networks based on the priority order.

It can be seen that, with the device for implementing link aggregation according to embodiments of the disclosure, the multiple wireless networks are obtained by performing the network search. Each wireless network corresponds to an access point device and a historical record of network resource allocation corresponding to the link aggregation. The respective target historical record of network resource allocation corresponding to each of the at least one foreground application is determined from the multiple historical records of network resource allocation corresponding to the multiple wireless networks, and the multiple target historical records of network resource allocation are obtained. Each wireless network corresponds to a target historical record of network resource allocation. The priority order is determined for the multiple wireless networks based on the multiple target historical records of network resource allocation. The link aggregation is performed by selecting the at least two wireless networks from the multiple wireless networks based on the priority order. Therefore, a priority order of accessing the wireless networks may be determined based on the historical records of network resource allocation corresponding to the wireless networks, and the link aggregation is implemented by selecting the wireless networks based on the priority order, to improve the intelligence of link aggregation.

In a possible example, in determining the respective target historical record of network resource allocation corresponding to each of the at least one foreground application from the historical records of network resource allocation corresponding to the multiple wireless networks and obtaining the multiple target historical records of network resource allocation, the determining unit 402 is further configured to: selecting a foreground application from the at least one foreground application as a target foreground application while the electronic device is in a preset operation mode; and determine a target historical record of network resource allocation corresponding to the target foreground application and the preset operation mode from the historical records of network resource allocation corresponding to the multiple wireless networks, and obtaining the multiple target historical records of network resource allocation.

In a possible example, in determining a priority order of the multiple wireless networks based on the multiple target historical records of network resource allocation, the determining unit 402 is further configured to obtain a respective allocation ratio coefficient of network resource corresponding to each target historical record of network resource allocation of the multiple target historical records of network resource allocation and obtain multiple allocation ratio coefficient sets of network resource, in which each allocation ratio coefficient set of network resource includes at least one target allocation ratio coefficients of network resource; determine a respective evaluation value corresponding to each wireless network of the multiple wireless networks based on the multiple allocation ratio coefficient sets of network resource and obtain multiple evaluation values; and determine the priority order of the multiple wireless networks based on the multiple evaluation values.

In a possible example, in determining the respective evaluation value corresponding to each wireless network of the multiple wireless networks based on the multiple allocation ratio coefficient sets of network resource and obtaining the multiple evaluation values, the determining unit 402 is further configured to determine a target number of the target allocation ratio coefficients of network resource in an allocation ratio coefficient i of network resource, determine a target average value of all allocation ratio coefficients of network resource, in which the allocation ratio coefficient set i of network resource is any one of the multiple allocation ratio coefficient sets of network resource; determine a target first weight corresponding to the target number based on a preset mapping relationship between numbers and first weights; determine a target second weight based on the target first weight, in which a sum of the target first weight and the target second weight is 1; obtain an evaluation value corresponding to the allocation ratio coefficient set i of network resource by calculating based on the target first weight, the target average value and the target second weight.

In a possible example, in performing the link aggregation by selecting the at least two wireless networks based on the priority order, the network accessing unit 404 is further configured to obtain an indoor position corresponding to the electronic device; determine a respective distance between the indoor location and an access point device corresponding to each wireless network of the multiple wireless networks, and obtain multiple distance values; and select at least two distance values less than a preset distance value from the multiple distance values, and perform the link aggregation by selecting the at least two wireless networks from the wireless networks corresponding to the at least two distances based on the priority order.

In a possible example, when the at least two wireless networks include two Wi-Fi data networks, in performing the link aggregation by selecting the at least two wireless networks from the wireless networks corresponding to the at least two distances based on the priority order, the network accessing unit 403 is further configured to detect link quality of a first Wi-Fi data link and link quality of a second Wi-Fi data link; determine an allocation ratio of data packet of the first Wi-Fi data link to the second Wi-Fi data link based on the link quality of the first Wi-Fi data link and the link quality of the second Wi-Fi data link; and transmit data packets by allocating the data packets to be transmitted to the first Wi-Fi data link and the second Wi-Fi data link based on the allocation ratio of data packet.

In a possible example, in detecting the link quality of the first Wi-Fi data link, the network accessing unit 403 is further configured to: measure a data transmission rate, a round-trip delay and a bit error rate of the first Wi-Fi data link, and determine the link quality of the first Wi-Fi data link based on the round-trip delay, the data transmission rate, and the bit error rate of the first Wi-Fi data link.

Figure 6:
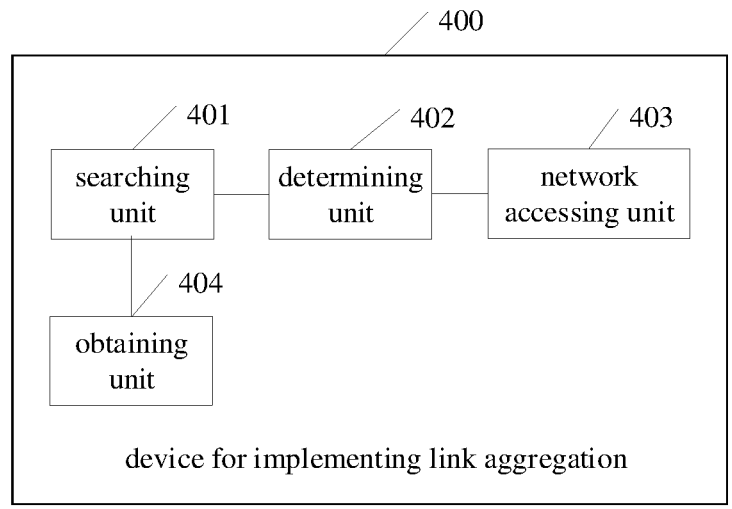
FIG. 6 is another block diagram illustrating composition of functional units of a device for implementing link aggregation according to embodiments of the disclosure.

In a possible example, as illustrated in FIG. 6, FIG. 6 is another variant structure of a device for implementing link aggregation as illustrated in FIG. 5. Compared with FIG. 5, the device of FIG. 6 may further include an obtaining unit 404.

The obtaining unit 404 is configured to obtain a current network rate.

The searching unit 401 is configured to execute the network search when the current network rate is lower than a preset network rate.

Figure 7:
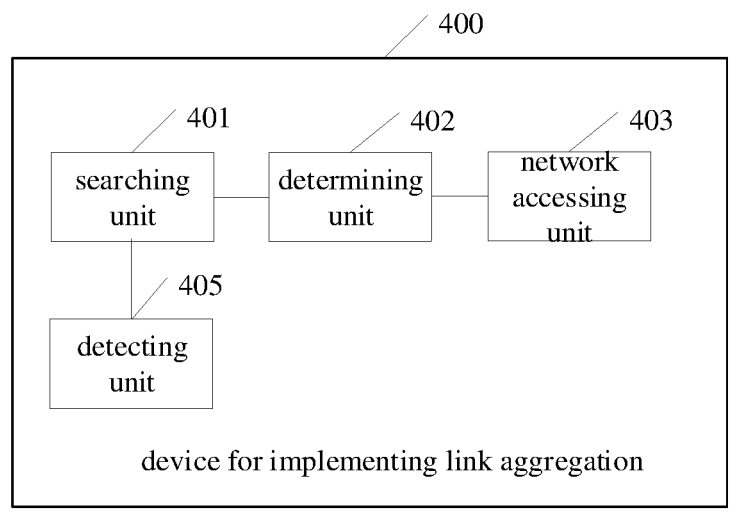
FIG. 7 is another block diagram illustrating composition of functional units of a device for implementing link aggregation according to embodiments of the disclosure.

In a possible example, as illustrated in FIG. 7, FIG. 7 is another variant structure of the device for implementing link aggregation as illustrated in FIG. 5. Compared with FIG. 5, the device of FIG. 7 may further include a detecting unit 405.

The detecting unit 405 is configured to detect a current quantity of electricity of the electronic device. The searching unit 401 is configured to perform the network search when the current quantity of electricity is greater than a preset quantity threshold.

Figure 8:
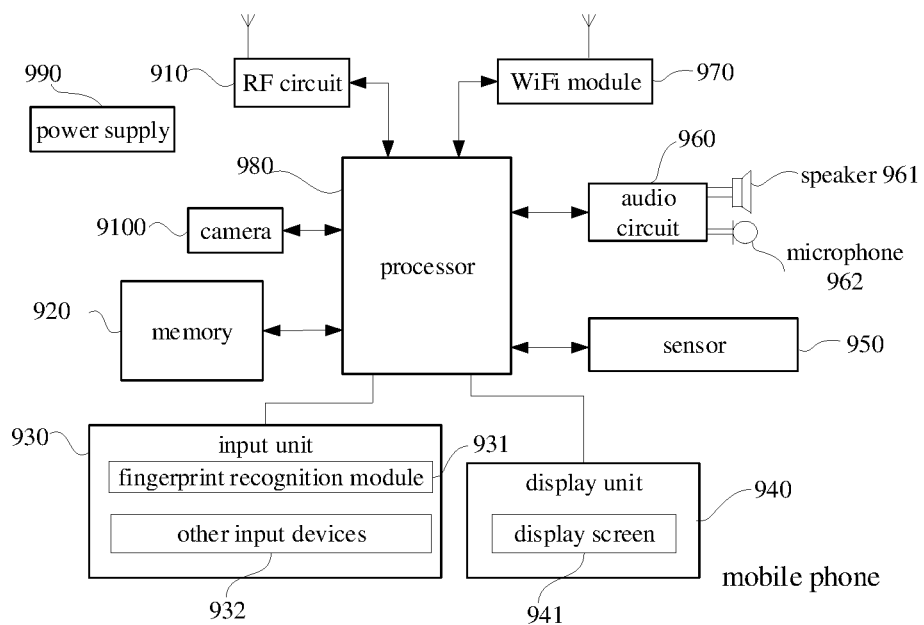
FIG. 8 is a schematic diagram illustrating a structure of an electronic device according to embodiments of the disclosure.

Embodiments of the disclosure further provide another electronic device. As illustrated in FIG. 8, for convenience of description, only the part relevant to embodiments of the disclosure is illustrated, and the detailed technical details are undisclosed, details can refer to the method embodiments. The electronic device may be a mobile phone, a tablet computer, a personal digital assistant (PDA), a point of sales (POS) a vehicle-mounted computer, etc. In some examples, the electronic device is the mobile phone to describe the disclosure.

FIG. 8 is a block diagram illustrating a partial structure of a mobile phone related with an electronic device according to embodiments of the disclosure. As illustrated in FIG. 8, the mobile phone includes a radio frequency (RF) circuit 910, a memory 920, an input unit 930, a display unit 940, a sensor 950, an audio circuit 960, a wireless fidelity (Wi-Fi) module 970, a processor 980, and a power supply 990. Those skilled in the art will appreciate that the structure of the mobile phone illustrated in FIG. 8 does not constitute a limitation on a mobile phone, which may include more or fewer components than illustrated in figure, or the components can be combined, or the structure can include different component arrangements.

The various constituent components of the mobile phone will be described in detail in combination with FIG. 8.

The RF circuit 910 may be configured to receive and transmit information. Generally, the RF circuit 910 includes, but is not limited to, an antenna, at least one amplifier, a transceiver, a coupler, a low noise amplifier (LNA), a duplexer, etc. In addition, the RF circuit 910 may further communicate with networks and other devices over wireless communications. The wireless communication may use any communication standard or protocol, including but not limited to a Global System of Mobile Communication (GSMX), a General Packet Radio Service (GPRS), a Code Division Multiple Access (CDMA), a Wideband Code Division Multiple Access (WCDMA), a Long Term Evolution (LTE), an e-mail, a Short Message Service (SMS), etc.

The memory 920 may be configured to store software programs and modules. The processor 980 executes various functional applications and data processing of the mobile phone by running the software programs and modules stored in the memory 920. The memory 920 may include a program storage area and a data storage area. The program storage area may store operation systems and application programs required by at least one function. The data storage area may store data created based on the use of the mobile phone. In addition, the memory 920 may include a high-speed random-access memory, a non-volatile memory, such as at least one magnetic disk storage device, a flash memory device, or other non-volatile solid-state storage devices.

The input unit 930 may be configured to receive input digital or character information, and generate key signal inputs related to user configuration and function control of the mobile phone. In detail, the input unit 930 may include a fingerprint recognition module 931 and other input device 932. The fingerprint recognition module 931 may collect the fingerprint data of the user. In addition to the fingerprint recognition module 931, the input unit 930 may further include other input devices 932. In detail, other input devices 932 may include but are not limited to one or more of touch screen, physical keyboard, function keys (such as volume control buttons, switch buttons, etc.), trackball, mouse, joystick, etc.

The display unit 940 may be configured to display information input by a user or information provided to a user and various menus of the mobile phone. The display unit 940 may include a display screen 941. Optionally, the display screen 941 can be configured in the form of liquid crystal display (LCD), organic light emitting diode (OLED), or or inorganic light emitting diode.

The mobile phone may further include at least one sensor 950, such as optical sensor, motion sensor, pressure sensor, temperature sensor, and other sensors. In detail, the optical sensor may include ambient light sensor (also referred to as light sensor) and proximity sensor. The ambient light sensor may adjust the backlight brightness of the mobile phone based on the brightness of the ambient light, thereby adjusting the brightness of the display screen 941. The proximity sensor may turn off the display screen 941 and/or the backlight when the mobile phone moves to the ear. As a kind of motion sensor, the accelerometer sensor may detect the magnitude of the acceleration in each direction (generally three-axis), detect the magnitude and direction of gravity when static, applied to applications of recognizing the attitude of the mobile phone (such as horizontal and vertical screen switching, magnetometer attitude calibration) and application of recognizing vibration (such as a pedometer, knock), etc. For other sensors equipped on the mobile phone such as a gyroscope, a barometer, a hygrometer, a thermometer, an infrared sensor, descriptions of those sensors are not repeated here.

The audio circuit 960, the speaker 961, and the microphone 962 may provide an audio interface between the user and the mobile phone. The audio circuit 960 may convert electrical data and transmit converted electrical data to the speaker 961. The speaker 961 converts the received electrical data into a sound signal and play the sound signal. The microphone 962 converts the collected sound signal to an electrical signal which is received and converted by the audio circuit 960 to audio data. The audio data is processed by an audio data playback processor 980, and the processed audio data is transmitted to another mobile phone via the RF circuit 910, or to a memory 920 for further processing.

Wi-Fi is a short-range wireless transmission technology. The mobile phone may help the user to send and receive emails, browse web pages and access streaming media through the Wi-Fi module 970, which provides wireless broadband Internet access for the user. Although FIG. 8 illustrates the Wi-Fi module 970, it is to be understood that the Wi-Fi module 970 is not a necessary component of the mobile phone, and may be omitted as desired without altering the essence of the disclosure.

The processor 980, as a control center of the mobile phone, connects various components of the mobile phone through various interfaces and circuits, runs or executes software programs and/or modules in the memory 920 and calls the data stored in the memory 920 to execute various functions and processing data of the mobile phone, to further entirely monitor the mobile phone. Optionally, the processor 980 may include one or more processing units. In some examples, the processor 980 may be integrated with an application processor and a modem processor. The application processor mainly deals with an operating system, a user interface and an application program. The modem processor mainly deals with wireless communication. It is to be understood that the above modem may be not integrated in the processor 980.

The mobile phone further includes the power supply 990 for powering various components, such as a battery. The some examples, the power supply can be logically connected to the processor 980 through a power management system, thereby implementing functions such as charging, discharging, and power consumption management through the power management system.

The mobile phone may further include a camera 9100. The camera 9100 is configured to capture images and videos and transmit the captured images and videos to the processor 980 for processing.

The mobile phone may further include a Bluetooth module, which is not be repeated here.

In embodiments illustrated in FIG. 2 and FIG. 3, each block of the method process may be implemented based on the structure of the mobile phone.

Embodiments of the disclosure further provide a computer storage medium. The computer storage medium is configured to store computer programs for electrical data exchange. The computer programs are configured to cause a computer to execute some or all of the method embodiments described above. The computer can be an electronic device.

Embodiments of the disclosure further provide a computer program product. The computer program product includes a non-transitory computer-readable storage medium for storing computer programs. The computer programs may be operated to cause a computer to execute some or all of the method embodiments. The computer program product may be a software installation package. The computer can be an electronic device.

It should be noted that, for simple description, each foregoing method embodiment is described as a series of action combinations, however, those skilled in the art will appreciate that the disclosure is not limited by the order of acts described, since certain blocks may be performed in other sequences or simultaneously in accordance with the disclosure. In addition, those skilled in the art should understand that embodiments described in the specification are preferred embodiments, and the actions and modes involved are not necessarily required by the disclosure.

In the above embodiments, the descriptions of various embodiments have their own emphasis, and some embodiments have not been described in detail, and others may refer to related descriptions of other embodiments.

In several embodiments according to the disclosure, it is to be understood that the disclosed device may be implemented in other ways. For example, the above device embodiments are merely illustrative, such as division of units, only a logical function division. There may be additional division modes when actual implementation, such as a plurality of units or components may be combined or may be integrated into another system, or some features may be omitted, or not performed. The coupling or direct coupling or communication connection of each other shown or discussed may be an indirect coupling or communication connection through some interfaces, devices, or units, which may be in electrical or other forms.

The above units described as separate parts may or may not be physically separated, the parts shown as units may or may not be physical units, which may be located in one place, or may be distributed to multiple network units. Some or all units may be selected according to the actual requirements to achieve the purpose of the disclosure.

In addition, functional units in embodiments of the disclosure may be integrated in a processing unit, or may be physically existed separately, or two or more units may be integrated in one unit. The above integrated unit may be implemented in the form of a hardware or in the form of a software functional unit.

An integrated unit may be stored in a computer readable memory if it is implemented in the form of a software function unit and sold and used as an independent product. On the basis of such an understanding, the technical solution of the present disclosure essentially or partly contributing to the prior art, or all or part of the technical solution may be embodied in the form of a software product, which is stored in a memory, including several instructions configured to operate a computer device (which may be a personal computer, a server or a network device, etc.) to perform all or part of the blocks of various embodiments of the disclosure. The forgoing memory includes a USB disk, a read-only memory (ROM), a random-access memory (RAM), a mobile hard disk, a magnetic disk or an optical disk, and other media that may store program codes.

Those skilled in the art may understand that all or some of the blocks in the above embodiments may be implemented by instructing relevant hardware through a program, and the program may be stored in a computer readable memory which may be a flash disk, a ROM, a RAM, a magnetic disk or an optical disk, etc.

The above are detailed descriptions of embodiments of the disclosure. Specific examples are applied to elaborate principles and implementations of the disclosure. The description of the above embodiments are only configured to help understand the method and core concepts of the disclosure; at the same time, for those skilled in the art, there may be changes in the specific implementation and application scope according to the idea of the disclosure. In summary, the contents of the summary should not be construed as a limitation of the disclosure.

What is claimed is:

1. A method for implementing link aggregation, for an electronic device, the method comprising:
    obtaining multiple wireless networks by performing network search, each wireless network corresponding to a respective access point device and a respective historical record of network resource allocation corresponding to a link aggregation;
    determining a respective target historical record of network resource allocation corresponding to each of at least one foreground application from multiple historical records of network resource allocation and obtaining multiple target historical records, each wireless network corresponding to a respective target historical record, wherein the foreground application is an application running in a foreground of the electronic device;
    determining a priority order of the multiple wireless networks based on the multiple target historical records; and
    performing a link aggregation by selecting at least two wireless networks from the multiple wireless networks based on the priority order,
    wherein determining the respective target historical record and obtaining the multiple target historical records comprise:
        selecting one of the at least one foreground application as a target foreground application while the electronic device is in a preset operation mode, wherein the preset operation mode comprises at least one of a single screen mode, a split screen mode, a foldable screen mode, or a double-sided screen mode;
        determining a target historical record corresponding to the target foreground application and the preset operation mode from the multiple historical records; and
        obtaining the multiple target historical records.

2. The method of claim 1, wherein determining the priority order comprises:
    for each of the multiple target historical records, obtaining at least one target allocation ratio coefficient of network resource corresponding to the target historical record as an allocation ratio coefficient set of network resource, and obtaining multiple allocation ratio coefficient sets, each allocation ratio coefficient set including at least one target allocation ratio coefficient;
    determining a respective evaluation value of each of the multiple wireless networks based on the multiple allocation ratio coefficient sets, and obtaining multiple evaluation values; and
    determining the priority order of the multiple wireless networks based on the multiple evaluation values.

3. The method of claim 2, wherein determining the respective evaluation value and obtaining the multiple evaluation values comprises:
    for each allocation ratio coefficient set, determining the target number of the target allocation ratio coefficients included in the allocation ratio coefficient set;
    determining a target first weight corresponding to the target number based on a preset mapping relationship between numbers and first weights;
    determining a target second weight based on the target first weight, a sum of the target first weight and the target second weight being 1; and
    obtaining the evaluation value corresponding to the allocation ratio coefficient set based on the target first weight, the target average value, and the target set weight.

4. The method of claim 1, wherein performing the link aggregation comprises:
    obtaining an indoor position corresponding to the electronic device;
    determining a respective distance between the indoor position and an access point device corresponding to each of the multiple wireless networks, and obtaining multiple distances;
    selecting at least two distances less than a preset distance from the multiple distances, and performing the link aggregation by selecting the at least two wireless networks from wireless networks corresponding to the at least two distances.

5. The method of claim 4, in a case where the at least two wireless networks include 2 Wi-Fi data links, performing the link aggregation comprises:
- detecting link quality of a first Wi-Fi data link, and detecting link quality of a second Wi-Fi data link;
- determining an allocation ratio of data packet of the first Wi-Fi data link to the second Wi-Fi data link based on the link quality of the first Wi-Fi data link and the link quality of the second Wi-Fi data link; and
- transmitting data packets by allocating the data packets to be transmitted to the first Wi-Fi data link and the second Wi-Fi data link based on the allocation ratio of data packet.

6. The method of claim 5, wherein detecting the link quality of the first Wi-Fi data link comprises:
- measuring a data transmission rate, a round-trip delay and a bit error rate of the first Wi-Fi data link, and determining the link quality of the first Wi-Fi data link based on the round-trip delay, the data transmission rate, and the bit error rate of the first Wi-Fi data link.

7. The method of claim 1, further comprising:
- obtaining a current network rate; and
- performing the network search based on the current network rate being less than a preset network rate.

8. The method of claim 1, further comprising:
- detecting a current quantity of electricity of the electronic device; and
- performing the network search based on the current quantity of electricity being greater than a preset quantity threshold.

9. An electronic device, comprising a processor, a memory, a communication interface, and one or more programs, wherein the one or more programs are stored in the memory and are configured to cause the processor to:
- obtain multiple wireless networks by performing network search, each wireless network corresponding to a respective access point device and a respective historical record of network resource allocation corresponding to a link aggregation;
- determine a respective target historical record of network resource allocation corresponding to each of at least one foreground application from multiple historical records of network resource allocation and obtain multiple target historical records, each wireless network corresponding to a respective target historical record, wherein the foreground application is an application running in a foreground of the electronic device;
- determine a priority order of the multiple wireless networks based on the multiple target historical records; and
- perform a link aggregation by selecting at least two wireless networks from the multiple wireless networks based on the priority order, wherein determine the respective target historical record and obtain the multiple target historical records comprise:
- select one of the at least one foreground application as a target foreground application while the electronic device is in a preset operation mode, wherein the preset operation mode comprises at least one of a single screen mode, a split screen mode, a foldable screen mode, or a double-sided screen mode;
- determine a target historical record corresponding to the target foreground application and the preset operation mode from the multiple historical records; and
- obtain the multiple target historical records.

10. The electronic device of claim 9, wherein the processor is caused to further:
- for each of the multiple target historical records, obtain at least one target allocation ratio coefficient of network resource corresponding to the target historical record as an allocation ratio coefficient set of network resource, and obtain multiple allocation ratio coefficient sets, each allocation ratio coefficient set including at least one target allocation ratio coefficient;
- determine a respective evaluation value of each of the multiple wireless networks based on the multiple allocation ratio coefficient sets, and obtain multiple evaluation values; and
- determine the priority order of the multiple wireless networks based on the multiple evaluation values.

11. The electronic device of claim 10, wherein the processor is caused to further:
- for each allocation ratio coefficient set, determine the target number of the target allocation ratio coefficients included in the allocation ratio coefficient set;
- determine a target first weight corresponding to the target number based on a preset mapping relationship between numbers and first weights;
- determine a target second weight based on the target first weight, a sum of the target first weight and the target second weight being 1; and
- obtain the evaluation value corresponding to the allocation ratio coefficient set based on the target first weight, the target average value, and the target set weight.

12. The electronic device of claim 9, wherein the processor is caused to further:
- obtain an indoor position corresponding to the electronic device;
- determine a respective distance between the indoor position and an access point device corresponding to each of the multiple wireless networks, and obtain multiple distances;
- select at least two distances less than a preset distance from the multiple distances, and perform the link aggregation by selecting the at least two wireless networks from wireless networks corresponding to the at least two distances.

13. The electronic device of claim 12, in a case where the at least two wireless networks includes 2 Wi-Fi data links, the processor is caused to further:
- detect link quality of a first Wi-Fi data link, and detect link quality of a second Wi-Fi data link;
- determine an allocation ratio of data packet of the first Wi-Fi data link to the second Wi-Fi data link based on the link quality of the first Wi-Fi data link and the link quality of the second Wi-Fi data link; and
- transmit data packets by allocating the data packets to be transmitted to the first Wi-Fi data link and the second Wi-Fi data link based on the allocation ratio of data packet.

14. The electronic device of claim 13, wherein the processor is caused to further:
- measure a data transmission rate, a round-trip delay and a bit error rate of the first Wi-Fi data link, and determine the link quality of the first Wi-Fi data link based on the round-trip delay, the data transmission rate, and the bit error rate of the first Wi-Fi data link.

15. The electronic device of claim 9, wherein the processor is caused to further: obtain a current network rate; and perform the network search based on the current network rate being less than a preset network rate.

16. The electronic device of claim 9, wherein the processor is caused to further:
  detect a current quantity of electricity of the electronic device; and
  perform the network search based on the current quantity of electricity being greater than a preset quantity threshold.

17. A non-transitory computer-readable storage medium, having computer programs for electrical data exchange stored thereon, wherein the computer programs cause a computer to execute a method for implementing link aggregation, the method comprising:
  obtaining multiple wireless networks by performing network search, each wireless network corresponding to a respective access point device and a respective historical record of network resource allocation corresponding to a link aggregation;
  determining a respective target historical record of network resource allocation corresponding to each of at least one foreground application from multiple historical records of network resource allocation and obtaining multiple target historical records, each wireless network corresponding to a respective target historical record, wherein the foreground application is an application running in a foreground of the electronic device;
  determining a priority order of the multiple wireless networks based on the multiple target historical records; and
  performing a link aggregation by selecting at least two wireless networks from the multiple wireless networks based on the priority order,
  wherein determining the respective target historical record and obtaining the multiple target historical records comprise:
    selecting one of the at least one foreground application as a target foreground application while the electronic device is in a preset operation mode, wherein the preset operation mode comprises at least one of a single screen mode, a split screen mode, a foldable screen mode, or a double-sided screen mode;
    determining a target historical record corresponding to the target foreground application and the preset operation mode from the multiple historical records; and
    obtaining the multiple target historical records.

* * * * *